UNITED STATES PATENT OFFICE.

JOHN URI LLOYD, OF CINCINNATI, OHIO.

PROCESS OF EXTRACTING, PURIFYING, OR EXCLUDING ALKALOIDS AND ALKALOIDAL SALTS.

1,048,712.     Specification of Letters Patent.     Patented Dec. 31, 1912.

No Drawing.     Application filed February 23, 1912. Serial No. 679,366.

*To all whom it may concern:*

Be it known that I, JOHN URI LLOYD, a citizen of the United States of America, and resident of Cincinnati, county of Hamilton, and State of Ohio, have invented certain new and useful Improvements in Processes of Extracting, Purifying, or Excluding Alkaloids and Alkaloidal Salts, of which the following is a specification.

My invention is an improved process of extracting or excluding alkaloidal substances, such as alkaloids and alkaloidal salts, which is simpler and may be performed more quickly than by any other process of extracting or excluding alkaloids, known to me.

I have discovered that alkaloids and alkaloidal salts will be thrown down from solution in water, alcohol and alcoholic and acidulated liquids when hydrated aluminum silicate is introduced into the solution and the mixture is agitated; and that alkaloids and alkaloidal substances will fail to enter into solution in the presence of insoluble hydrated aluminum silicate unless the alcoholic solution be rendered alkaline in character. I have also found by experiment that various forms of aluminum silicate hydrated or otherwise may be employed, and that the form of kaolin, known as fullers' earth, natural or refined, is especially effective in carrying out my invention.

My present invention, therefore, contemplates a process of obtaining alkaloid by means of an insoluble precipitant from a solution containing alkaloidal substances, when a solution of an alkaloid or an alkaloidal salt, natural or otherwise, is treated with some form of aluminum silicate, for the purpose of precipitating the alkaloidal substances contained in it; or in which a compound containing alkaloidal substances is treated with some form of aluminum silicate, for the purpose of preventing the alkaloids from going into solution when the compound is to be abstracted by a solvent such as water.

In carrying out my invention I employ aluminum silicate, preferably of the hydrated form, and introduce it into the solvent of an alkaloid or an alkaloidal salt after the alkaloidal substances are in solution, or at the time of introducing a compound containing them into the solvent, or by mixing the substances previous to adding to the liquid unless the solution, if alcoholic, be rendered alkaline in character. The former procedure precipitates the alkaloids and their salts when the mixture is agitated and causes them to be carried down in the form of a precipitate by the silicate as it settles to the bottom of the container. When the silicate is introduced into the solvent simultaneously with the compound containing alkaloidal substances, or when the alkaloidal compound and hydrated aluminum silicate are previously mixed, the presence of the silicate prevents the alkaloids and their salts from entering into solution, and consequently the alkaloids and their salts settle to the bottom of the container with the silicate while the other constituents of the compound go into or remain in solution. The precipitated alkaloids may be separated from the solution by filtration and they may afterward, if desirable, be separated from the silicate by treating the residue resulting from the filtration with a volatile liquid, such as chloroform or alcohol, which should be made alkaline in character in order to dissolve the alkaloids, or their salts, in the presence of the powdered silicate. The alkaloids or their salts may then be obtained in the dry or powdered form by evaporating the volatile solvent.

As a concrete example of my invention: Add about five grams of powdered fullers' earth to about forty cubic centimeters of an aqueous solution, containing about one gram of morphin sulfate and agitate the mixture. The morphin sulfate will be thrown out of solution with the insoluble silicate in the form of a precipitate and thus associated will be carried to the bottom of the container. The mixture of fullers' earth and morphin sulfate may then be removed by filtration and if the silicate be in sufficient amount, it will be found that the filtrate will not give any of the tests for morphin and will be entirely free from it.

I have found by experiment that different forms of hydrated aluminum silicate are varyingly effective and that different forms of kaolin or fullers' earth giving different analyses are capable of removing all the alkaloids or their salts from solution, if introduced into the solution in sufficient quantities and agitated in sufficient amounts.

It will be understood, that while I have given, as an example of my invention the process of extracting or precipitating commercial morphin or an alkaloidal salt from solution, that my invention may be employed in extracting any alkaloidal substance from a compound or mixture containing it.

What I claim is:

1. A process of precipitating alkaloids and alkaloidal salts from solution by means of an aluminum silicate.

2. A process of separating alkaloidal substances from solution, which consists in adding hydrated aluminum silicate to the solution, substantially as described.

3. A process of rendering alkaloids insoluble, consisting in treating them with hydrated aluminum silicate.

4. A process of rendering alkaloidal substances insoluble, consisting in treating them with hydrated aluminum silicate.

5. A process of precipitating alkaloidal salts from solution, which consists in adding an insoluble silicate of an earth metal to the solution.

6. A process of precipitating alkaloidal substances, which consists in introducing powdered aluminum silicate into a solution containing them and agitating the mixture.

7. A process of precipitating alkaloidal substances which consists in introducing hydrated aluminum silicate into a solution containing them and agitating the mixture.

8. A process of precipitating an alkaloid from a mixture containing it, which consists in treating the mixture with a powdered silicate of an earth metal and agitating it in the presence of a solvent.

9. A process of precipitating an alkaloidal salt from a mixture containing it, which consists in treating the mixture with a powdered silicate of an earth metal and agitating it in the presence of a solvent.

10. A process of rendering alkaloidal substances insoluble, which consists in treating material containing them with an insoluble aluminum silicate and then agitating the mixture in water.

11. A process of precipitating alkaloidal salts from solution, which consists in adding to said solution an insoluble salt of an earth metal.

12. A process of separating an alkaloidal compound from solution by the treatment thereof with fullers' earth.

13. A process of separating an alkaloidal compound from solution by the treatment thereof with clay.

14. A process of rendering an alkaloidal compound insoluble by the treatment thereof with clay.

JOHN URI LLOYD.

Witnesses:
W. THORNTON BOGERT,
E. W. McCALLISTER.